United States Patent
Manzon

(10) Patent No.: US 6,860,297 B2
(45) Date of Patent: Mar. 1, 2005

(54) LOCAL DEGRADED AREA REPAIR AND RESTORATION COMPONENT FOR PRESSURE RETAINING ITEMS

(76) Inventor: Paul Stephen Manzon, 272 Grubb Rd., Pottstown, PA (US) 19465

( * ) Notice: Subject to any disclaimer, the term of this patent is extended or adjusted under 35 U.S.C. 154(b) by 0 days.

(21) Appl. No.: 10/098,776

(22) Filed: Mar. 14, 2002

(65) Prior Publication Data

US 2002/0129860 A1 Sep. 19, 2002

Related U.S. Application Data

(60) Provisional application No. 60/275,949, filed on Mar. 16, 2001.

(51) Int. Cl.$^7$ ................................................. F16L 55/16
(52) U.S. Cl. ........................ 138/99; 138/97; 29/402.09; 264/36.15
(58) Field of Search ........................... 138/99, 97, 110; 264/36.17, 36.18, 36.15; 29/402.09, 402.18

(56) References Cited

U.S. PATENT DOCUMENTS

| | | | | |
|---|---|---|---|---|
| 185,153 A | * | 12/1876 | Wilson | 138/99 |
| 1,704,760 A | * | 3/1929 | Parker | 138/99 |
| 2,114,145 A | * | 4/1938 | Kane et al. | 138/99 |
| 2,307,148 A | * | 1/1943 | McGuire | 138/99 |
| 2,492,507 A | * | 12/1949 | Tipton | 138/99 |
| 2,520,802 A | * | 8/1950 | Hampton | 138/99 |
| 2,850,045 A | * | 9/1958 | Soehnlen et al. | 138/92 |
| 3,150,690 A | * | 9/1964 | Danielson et al. | 138/99 |
| 3,619,548 A | * | 11/1971 | Cavagnero | 219/105 |
| 4,251,170 A | * | 2/1981 | Sheridan | 138/103 |
| 5,020,572 A | * | 6/1991 | Hunt | 138/97 |
| 5,388,317 A | * | 2/1995 | Johansen et al. | 138/99 |
| 5,632,307 A | * | 5/1997 | Fawley et al. | 138/99 |
| 5,722,463 A | * | 3/1998 | Smyth et al. | 138/158 |
| 6,386,236 B1 | * | 5/2002 | Buckley | 138/97 |
| 6,531,673 B2 | * | 3/2003 | Fedorcak | 219/74 |

* cited by examiner

Primary Examiner—Patrick Brinson
(74) Attorney, Agent, or Firm—Michael F. Petock, Esq.

(57) ABSTRACT

What is new in the art to which my invention pertains is that it allows for a repair or restoration of a pressure retaining item that has local material degradation to an acceptable state of condition for continued operation without the need to cut out the degraded section of material or breach the pressure boundary of a pressure retaining item. Common methods of repair include removal of degraded or affected material section and replacement with a new section of equivalent material by joining the new material to an existing item at a location of adequate thickness using full or complete penetration welds. This type of repair may be referred to in the industry as a "flush patch repair". An additional type of repair where a section of material degradation may be localized is a "weld build-up repair' wherein weld metal is deposited onto the existing area of affected material to return the material to its original thickness. Both "flush patch repair" and weld build-up repair" methods require breaching of the pressure boundary integrity of a pressure retaining item to implement a repair. The invention does not require breaching a pressure boundary.

20 Claims, 2 Drawing Sheets

LOCAL DEGRADED AREA REPAIR AND RESTORATION COMPONENT FOR PRESSURE RETAINING ITEMS

CROSS REFERENCE TO RELATED APPLICATIONS

This application claims the benefit of U.S. Provisional application No. 60/275,949, filed Mar. 16, 2001 by the Applicant herein entitled "Local Thin Area Repair and Restoration Component for Pressure Retaining Items".

BACKGROUND OF THE INVENTION

This application is for a component that is used to repair or restore structural and pressure retention integrity of pressure retaining items. Pressure retaining items include but are not limited to items referred to as pressure vessels, tanks, towers, boilers, reactors, heat exchangers, pipe, pumps, and valves. Pressure retaining items are generally constructed of metallic material. Methods of construction of pressure retaining items include welded construction, bolted construction, riveted construction, and a completed pressure retaining item may be constructed using one or various combinations of welded, bolted, or riveted construction. Various industry Codes and Standards provide construction, operation, and inspection requirements pertaining to pressure retaining items in the United States. These include Codes and Standards published by various organizations including but not limited to the American Society of Mechanical engineers (ASME), American National Standards Institute (ANSI), Tubular Exchanger Manufacturers Association (TEMA), American Petroleum Institute (API), and National Board Inspection Code (NBIC). Local jurisdiction authorities (State, Commonwealth, or City) may require compliance with an industry Code or Standard or a combination of Codes and Standards. Pressure retaining items contain fluids (gases or liquids) under a pressure that may be either internal (a pressure acting on the inside of a pressure retaining item) or external (pressure acting on the outside of a pressure retaining item). Pressure retaining items are used to contain, move, or process various fluids. Commercial and government industries using pressure retaining items include but are not limited to chemical, petrochemical process, food, pharmaceutical, water, oil, gas industries, electrical power generation (fossil, hydro, and nuclear), government energy and nuclear process facilities, and various manufacturing industries.

Pressure retaining parts of pressure retaining items way be subjected to material degradation (where degradation is defined as a change in state from that originally intended to the extent that an item that is identified as degraded is not capable of meeting one or more intended purposes). Degradation of material may include thinning of a material, cracks forming within or upon the surface of a material, pitting of a material, or general overall structural damage in a material. Degradation of a material, including material thinning, pitting or cracking, may be caused by but is not limited to erosion or corrosion. Material degradation can occur from a chemical reaction between the fluid contained by a pressure retaining item and its material of construction. Material degradation can occur due to movement or impingement of fluid against pressure retaining material of construction of a pressure retaining item. Corrosion, erosion or other mechanisms, either individually or in combination, can result in degradation of material that is required to maintain the structural and pressure retaining capability of pressure retaining items. Degradation of a material, including material geometrical changes or changes in a material physical property including but not limited to changes in material yield strength, tensile strength, modulus of elasticity, etc., may be caused by an imposed load, pressure, or temperature condition. Material degradation can be global (by global it is meant that essentially all or a large portion of the materials of construction of a pressure retaining item are subjected to material degradation). Alternatively, material degradation can be local (by local it is meant that a small amount of the total materials of construction of a pressure retaining item subjected to material degradation). Either global or localized material degradation can result in a potential hazardous operating condition wherein as-designed and constructed safety factors against fluid leakage or pressure retaining item structural integrity or pressure retaining item pressure boundary pressure retention capability are reduced. In severe material degradation conditions (either global or local), failure of pressure retaining items can occur. Pressure retaining item failure can result in affecting the safety of personnel safety and/or in economic losses.

To obtain information pertaining to material degradation occurring in pressure retaining items periodic inspections of pressure retaining items are performed. Inspection methods include visual inspection for observation of material degradation or visual inspection for observation of fluid leakage. Inspection methods also include pressure retaining item material of construction thickness measurements for determination of material degradation. Thickness measurements can be obtained using various data collection and nondestructive examination methods including but not limited to physical measurements using various gages or measuring instruments or by performing ultrasonic examination to obtain material condition and thickness information.

Where material degradation is determined, assessments of remaining life and adequacy of pressure retaining item to remain in service while continuing to operate within the requisite factors of safety are performed. Where it is determined that a specific pressure retaining item does not have the requisite factor of safety to continue operation several options are available including 1) changing the conditions under which that specific pressure retaining item is operated to conditions that are acceptable for continued safe operation, of 2) replacing or repairing unacceptable parts of pressure retaining items.

Common methods of repair include removal of a material section determined to be unacceptable and replacement with a new section of material of equivalent or better structural, pressure retaining, and/or corrosion and/or erosion resistance than that used in the original construction. New sections of replacement material are most often installed by joining them to an existing pressure retaining item at locations with adequate material thickness for continued operation of the item using full or complete penetration welds. This type of repair may be referred to as a "flush patch repair".

A different type of repair used where a section of material degradation may be localized is referred to as "weld build-up repair". A "weld build-up repair" is a repair method wherein weld metal is deposited on to the area of unacceptable material to return the material to a condition wherein the pressure retaining item can be returned to service under a specific set of operating conditions.

As often considered but not generally allowed by some Codes or Standards that govern the construction, operation, and inspection of pressure retaining items, or that may not be allowed a jurisdictional authorities (State, Commonwealth, or City) is a method of repair referred to as a "fillet welded patch plate" repair. In this type repair, a section of new material is fit over a local area of a specific pressure retaining item at the location of unacceptable material and joined to the surface of that specific pressure retaining item using a fillet weld. This method of repair does not readily allow for volumetric examination or pressure integrity examination of the completed fillet weld joint and the completed repair may result in a smaller factor of safety than either a "flush patch repair" or "weld build-up" repair".

"Flush patch repair" and the "weld build-up repair" methods of repair or restoration are generally allowed by governing Codes and Standards for construction, operation, or inspection, and are also generally allowed by most jurisdictional authorities (State Commonwealth, or City) in the United States. "Flush patch repair' and the "weld build-up repair" methods of repair allow for a volumetric examination and pressure integrity examination of the welds used in a completed repair. "Flush patch repair' and the "weld build-up repair" methods may result in equal or greater pressure retention and structural integrity factors of safety to those that existed at the time of original construction. "Flush patch repair" or "weld build-up repair" methods for repair of pressure retaining items have several limitations or negative aspects including but not limited to:

"Flush patch repair or" "weld build-up repair":
1. require removal of pressure retaining items from service
2. require cutting out of pressure retaining item local material degraded areas ("flush patch repair" only)
3. require preparation of pressure retaining item remaining material for welding of the new replacement section of material or weld buildup by cutting or grinding.
4. require exact cutting, curvature fabrication (by rolling, forming, or machining) and weld end preparation of the new section of material for fit-up ("flush patch repair" only).
5. may require use of weld joint backing strips. The backing strips may or may have to remain in place depending on their accessibility after welding. If left in place they may contribute to a reduction in a pressure retaining item factor of safety or even worse the acceleration of new local areas of corrosion or erosion due to the introduction of a new fluid flow path obstruction ("flush patch repair" only).
6. may expose personnel to lethal or hazardous fluid contents of a pressure retaining item such as chemical, gas, or radioactive fluid contents.
7. introduce the potential for damage to internal parts of pressure retaining items such as damage to tubes of heat exchangers.
8. introduce the potential for intrusion of foreign materials into the internals of pressure retaining items.
9. may require hydrostatic or pneumatic testing of a. pressure retaining item to insure pressure retaining integrity has been maintained due to breach of pressure boundary.
10. may only be allowed on the inside surface of a pressure retaining item or may only be allowed on the outside surface of a pressure retaining item depending on governing code or jurisdictional authority requirements.

BRIEF SUMMARY OF THE INVENTION

BRIEF DESCRIPTION OF THE INVENTION

The "Local Degraded Area Repair and Restoration Component for Pressure Retaining Items (Pressure Maintenance Cap)", hereinafter referred to as "the invention" or "pressure maintenance cap", is a component used to repair and restore the structural and pressure retaining integrity of pressure retaining items whose pressure retaining material of construction has been subjected to material degradation. The invention consists of a single component of metallic material that is welded to the surface of a pressure retaining item. The invention is welded directly over a section of material of a pressure retaining item where a section of pressure retaining material has been subjected to degradation. The configuration of the invention is a single piece of mental that has a cavity on one side built into it. The cavity portion of the invention allows for the invention having a skirt of material completely around its periphery that extends below the inner face surface of the invention. The invention can best be described by a comparison to one or more common items. To describe the invention in simple terms would be for one to compare its possible geometric configurations to those of 1) a standard shoe box cover, 2) the lid of a jar, 3) or an open sardine can. These are only illustrative examples for simple comparison to the general geometric configuration of the invention. The invention can be constructed by bending, welding, machining, forming, forging, or casting a piece of metal to match a contour of a surface of a pressure retaining item.

The end of the extended skirt portion of the invention is then welded to a pressure retaining item surface. This results in a completely enclosed cavity that would be formed between a pressure retaining item surface and the inner surface of the cap. Thus a section of unacceptable pressure retaining item material is completely encapsulated by the cap. If a section of unacceptable pressure retaining item material that is encapsulated by the invention degrades further, the cap assures that there would be no loss of pressure retaining or structural integrity in a specific pressure retaining item to which the cap is attached. The cap, based on an appropriate design and material selection that sizes the cap and its attachment welds appropriately for the intended purpose, can provide assurance that a pressure retaining item to which the cap is attached, has, after attachment of the cap, an original or better factor of safety against leakage or failure and with equal or better corrosion/erosion resistance, allowance, or capability than that in the as-designed and as-constructed condition of a pressure retaining item. The weld joining the cap to a pressure retaining item can be a complete or full penetration weld whose final as-welded configuration would allow for a complete through wall volumetric examination of the weld. Additionally, where desired, the encapsulated cavity between a pressure retaining item surface and the cap could be internally pressurized within the remaining structural and pressure integrity capability of the encapsulated section of material of a pressure retaining item for further assurance of leak tightness, structural integrity, and pressure retaining integrity verification of a pressure retaining item and the cap after completion of attachment of the cap.

OBJECTIVE AND ADVANTAGES OF THE INVENTION

The objective of the invention is to provide a simple, safe, cost effective, method of repairing a pressure retaining item. A further objective is to provide a method of repair that alleviates or eliminates many, if not all, of the negative aspects of some current repair methods, including repair methods referred to as the "flush patch repair" or the "weld build-up repair" methods (the "flush patch repair" or the "weld build-up repair" methods are described in the previous section of this Specification entitled "BACKGROUND OF THE INVENTION").

It is believed that the invention alleviates many of the negative aspects of the "flush patch repair" or "weld build-up repair" current common methods of repair, and offers several advantages. Negative aspects of the "flush patch repair" or "weld build-up repair" methods of repair that are alleviated by the invention and several advantages of the invention over the "flush patch repair" or "weld build-up repair" include but are not limited to the following:

The invention:
1. by it use and attachment may not require removal of the pressure retaining item from service
2. by it use and attachment may not require cutting out of the pressure retaining item local material degraded areas
3. by it use and attachment may only require minimal preparation of the pressure retaining item material for weld attachment of the invention in comparison to the "flush patch repair" or the "weld build-up repair" methods.
4. by it use and attachment may eliminate or minimize use of weld joint backing strips in the attachment weld between a pressure retaining item and the invention which then by not using said weld joint backing strip would substantially reduce or eliminate in most cases a requirement to impose or consider a reduction in the pressure retaining item factor of safety as applicable to a pressure retaining item's pressure retention or structural integrity.
5. by it use and attachment may eliminate or minimize use of weld joint backing strips in the attachment weld between a pressure retaining item and the invention which then by not using said weld joint backing strip would substantially reduce or eliminate an attachment with a geometrical configuration that would contribute to acceleration of existing areas of erosion or corrosion or lead to new areas that would be subjected to erosion or corrosion at rates in excess of those that existed prior to the attachment of the invention.
6. by it use and attachment may eliminate exposure of personnel to lethal or hazardous fluid contents such as chemical, gas, or radioactive fluid contents of a pressure retaining item.
7. by it use and attachment may eliminate the potential for damage to internal parts of pressure retaining items such as damage to tubes of heat exchangers. Damage to tubes of heat exchangers would necessitate repair of tubes or plugging of tubes with an associated loss in equipment performance and economic loss.
8. by it use and attachment may eliminates the potential for intrusion of foreign materials into the internals of pressure retaining items.
9. by it use and attachment may simplifies any required hydrostatic or pneumatic testing of pressure retaining item to insure pressure retaining integrity has been maintained due to breach of pressure boundary.
10. is not limited to a specific geometrical shape. It may be constructed to most any regular or irregular shape including but not limited to round, square, rectangular, obround, oval, triangular, or any combination of the these shapes.

BRIEF DESCRIPTION OF THE SEVERAL VIEWS OF THE DRAWING

General

There are two drawings that describe the invention, Drawing Sheet 1/2 and Drawing Sheet 2/2. Drawing Sheet 1/2 provides a general arrangement and general details of a geometrically round local degraded area repair and restoration component (pressure maintenance cap). Drawing Sheet 2/2 provides a general arrangement and general details of a geometrically obround local degraded area repair and restoration component (pressure maintenance cap). The invention, however, is not limited to shape. It may be constructed to most any regular or irregular shape including but not limited to round, square, rectangular, obround, oval, triangular, or any combination of the these shapes. Two drawings, Drawing Sheet 1/2 and Drawing Sheet 2/2 are provided to describe the general concept of the invention but these two drawings do not describe all possible detailed configurations or geometrical shapes of the invention.

Figure 1:
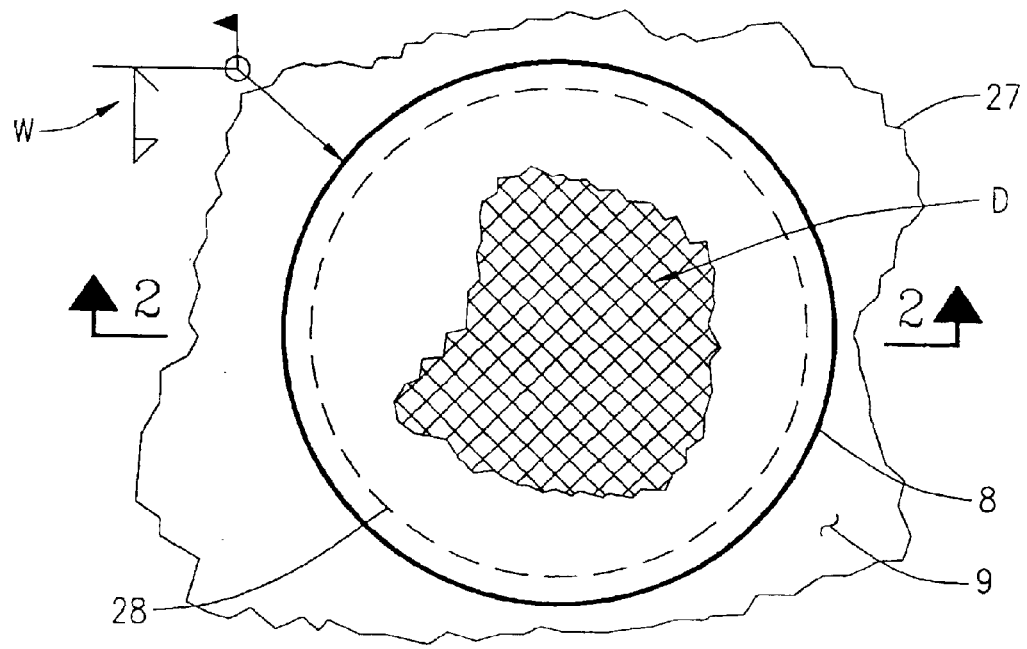

Drawing Sheet 1/2—FIG. 1

Figure 2:
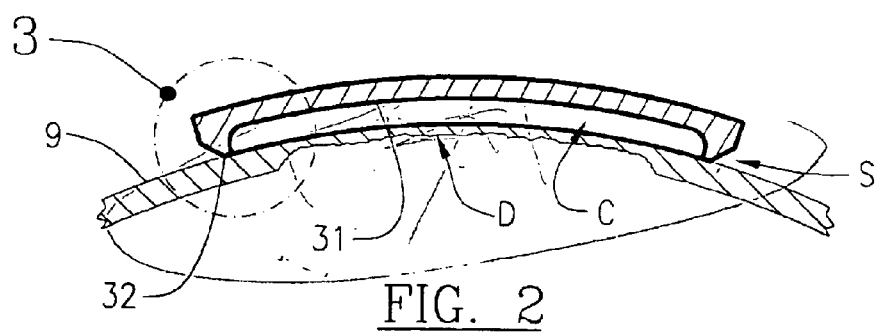
Figure 3:
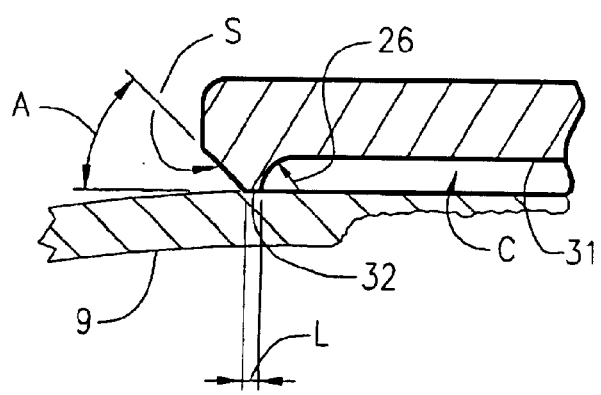
Figure 4:
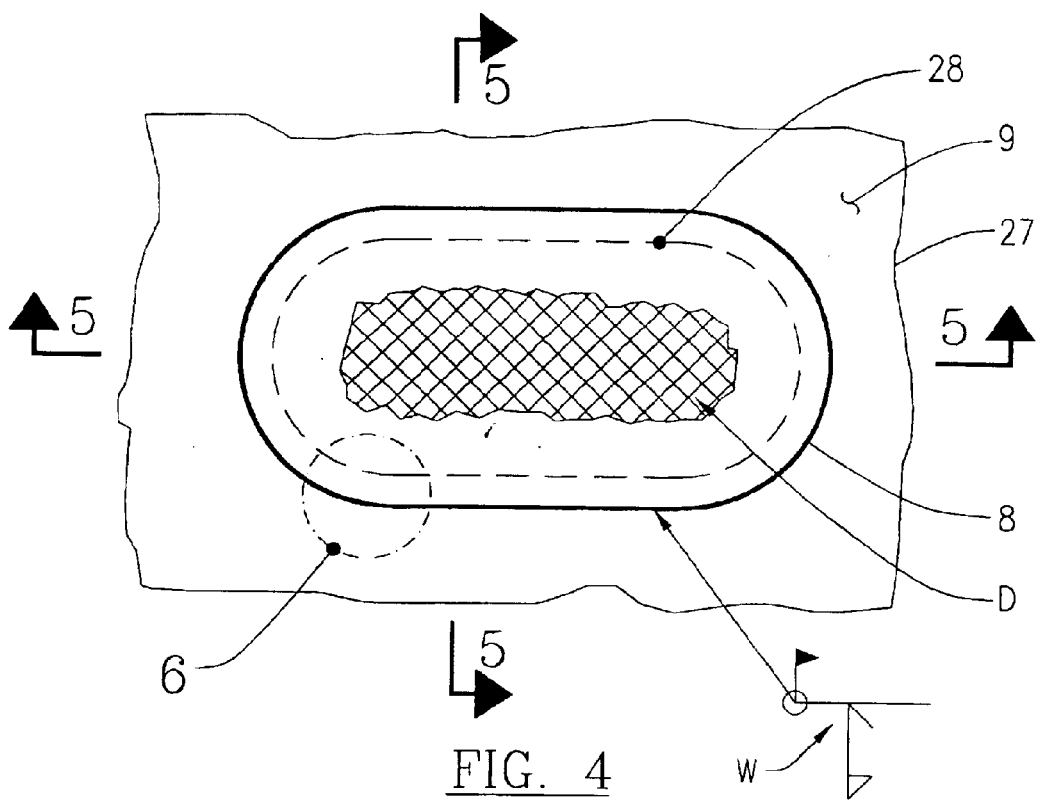
Figure 5:
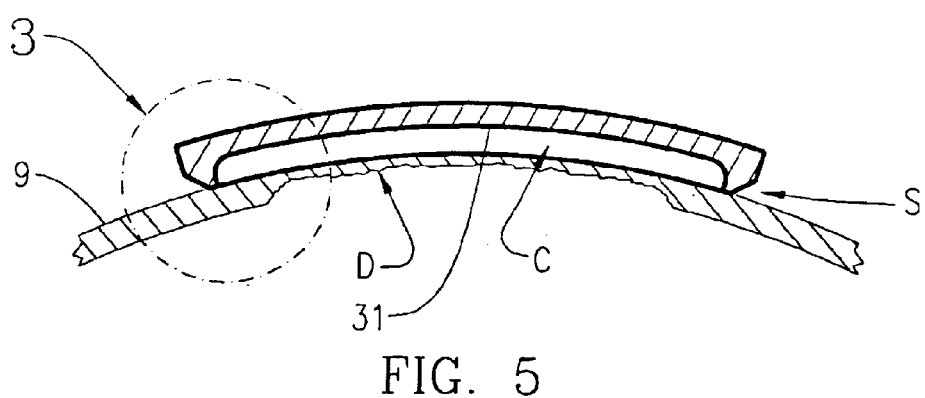

FIG. 1 depicts a plan view that shows how the invention (in a round configuration) would appear if one were to view a surface of a pressure retaining material, element 9, as shown in FIGS. 1, 2, 3, 4, and 5, after the invention had been attached. The surface of a pressure retaining material, element 9, shown in FIGS. 1, 2, 3, 4, and 5, could be, as an example: 1) a surface of a cylindrical pressure vessel shell, 2) a surface of a pressure vessel end closure head, 3) a surface of a pipe, 4) a surface of a shell of a flat bottomed storage tank, 5) a compound curved surface of a pump body, or 6) a compound curved surface of a valve body, amongst other pressure retaining item surfaces to which the invention can be attached. The irregular solid line, boundary line element 27 as shown in FIG. 1 for the invention in a round configuration, and as also shown in FIG. 4 for the invention in an obround configuration, depicts the boundary of a small section of a pressure retaining item surface that is being shown in the plan view, FIG. 1. The outer solid circular line, outer wall line element 8, as shown in FIG. 1 for the invention in an obround configuration, depicts the periphery of the invention and the outer wall of the skirt, skirt element S, as shown in FIGS. 2, 3, and 5. The inner dotted circular line, inner wall element 28, as shown in FIGS. 1, and 4, depicts the inner wall of the invention's skirt, skirt element S, as shown in FIGS. 2, 3, and 5. The cross hatched area in the center of the invention with the irregular boundary, degraded area element D, as shown in FIGS. 1, 2, 4, and 5, represents that local area of pressure retaining material, element 9, as shown in FIGS. 1, 2, 3, 4, and 5, where material degradation has occurred. The upper left hand corner of FIG. 1 depicts a sample weld joint connection configuration, weld symbol element W, as shown in FIGS. 1, and 4, of the invention to a pressure retaining item, element 9, as shown in FIGS. 1, 2, 3, 4, and 5. Weld symbol element W, as shown in FIGS. 1, and 4, depicts a complete or full penetration weld supplemented by a fillet weld with this fillet weld size being specifically dependent on a pressure loading and geometry of a specific pressure retaining item, a Code or Standard (a Code or Standard is described in the section of this Specification entitled "BACKGROUND OF THE INVENTION"), and the invention size, shape, and geometry.

Drawing Sheet 1/2—FIG. 2

FIG. 2 shows how the invention would look if one were to cut through the center of the invention (refer to View Line 2—2) after it being attached to a pressure retaining material, element 9, as shown in FIGS. 1, 2, 3, 4, and 5. A local area of pressure retaining material, degraded area element D, is shown in FIGS. 1, 2, 4, and 5. Also note that FIG. 2 presents the invention as placed on a cylindrical surface. This is only an example of the geometry of surface to which the invention can be applied.

As enclosed volume of open annular space, cavity element C, as shown in FIGS. 2, 3, and 5, is formed by placing the invention on the surface of the pressure retaining material, element 9, as shown in FIGS. 1, 2, 3, 4, and 5. The skirt, skirt element S, as shown in FIGS. 2, 3, and 5, of the invention comprises that volume of metal that lies between a) the inner surface of the invention, surface element 31, as shown in FIGS. 2, 3, and 5, that is parallel to the pressure retaining material surface, element 9, as shown in FIGS. 1, 2, 3, 4, and 5, and extends around the periphery of the invention and further extending in approximately a perpendicular direction from the inner surface of the invention, surface element 31, to a point where the end of this volume of metal can be placed such that it is in contact with the surface of the pressure retaining material, element 9. The skirt, skirt element S, as shown in FIGS. 2, 3, and 5, is beveled at the point where it would be placed in contact with the surface of the pressure retaining material at an angle, angle element A, as shwon in FIG. 3, suitable for the welding process and procedure selected such that fusion metal welding the skirt, skirt element S, of the invention to the pressur boundary material, element 9, as shown in FIGS. 1, 2, 3, 4, and 5, can achieve complete coalescence of metal at the interface of the invention skirt, skirt element S, and the pressure retaining material, element 9. The point of contact between the edge, edge element 32, as shown in FIGS. 2, and 3, of the skirt, skirt element S, as shown in FIGS. 2, 3, and 5, at the beveled end where the skirt, skirt element S, is contact with the surface of the pressure retaining material, element 9, as shown in FIGS. 1, 2, 3, 4, and 5, may be a knife edge configuration or have some very small flat dimension, dimension element L, as shown in FIG. 3. The small flat dimension, dimension element L, as shown in FIG. 3, is of such a length that for the welding process and procedure selected, fusion metal welding the skirt, skirt element S, as shown in FIGS. 2, 3, and 5, of the invention to the pressure boundary material, element 9, as shown in FIGS. 1, 2, 3, 4, and 5, can achieve complete coalescence of metal at the interface of the invention skirt, skirt element S, and the pressure retaining material, element 9.

Drawing Sheet 1/2—FIG. 3

FIG. 3 shows the basic configuration of the cavity, cavity element C, and skirt element S, both as shown in FIGS. 2, 3, and 5, of the invention at the attachment location of the invention where it is placed against the outer surface of the pressure retaining material, element 9, as shown in FIGS. 1, 2, 3, 4, and 5, such that the degraded portion of the pressure retaining material , degraded area element D, as shown in FIGS. 1, 2, 4, and 5, is encapsulated by the invention. A description of a weld preparation detail is shown as the beveled portion of the skirt, skirt element S, as shown in FIGS. 2, 3, and 5, having a bevel angle, angle element A, as shown in FIG. 3. The invention skirt, skirt element S, as shown in FIGS. 2, 3, and 5, can be manufactured with various material thicknesses and dimensions such that design pressure and loading requirements are satisfied. The edge, edge element 32, as shown in FIGS. 2 and 3, of the skirt, skirt element S, as shown in FIGS. 2, 3, and 5, which is in contact with the pressure retaining material outer surface, element 9, as shown in FIGS. 1, 2, 3, 4, and 5, is contoured such that the edge of the skirt, skirt element S, and the surface of the pressure retaining material, element 9, will match each other at their point of contact.

It should also be noted that FIG. 3 is also associated with Drawing Sheet 2/2 and is referred to in FIG. 5 of that drawing.

Drawing Sheet 2/2—FIG. 4

FIG. 4 depicts a plan view that shows how the invention (in an obround configuration) would appear if one were view a surface of a pressure retaining material, element 9, as shown in FIGS. 1, 2, 3, 4, and 5, after the invention had been attached to it. The surface of a pressure retaining material, element 9, as shown in FIGS. 1, 2, 3, 4, and 5, could be, as an example: 1) a surface of a cylindrical pressure vessel shell, 2) a surface of a pressure vessel end closure head, 3) a surface of a pipe, 4) a surface of a shell of a flat bottomed storage tank, 5) a compound curved surface of a pump body, or 6) a compound curved surface of a valve body, amongst other pressure retaining item surfaces to which the invention can be attached. The irregular solid line, boundary line element 27, as shown in FIG. 4, for the invention in an obround configuration, and as also shown in FIG. 1 for the invention in a round configuration) depicts the boundary of a small section of a pressure retaining item surface that is being shown in the plan view (FIG. 4). The outer solid circular line, outer wall line element 8, as shown in FIG. 4, for the invention in an obround configuration, and as also shown in FIG. 1 for the invention in a round configuration, depicts the periphery of the invention and the outer wall of the skirt, skirt element S, as shown in FIGS. 2, 3, and 5. The inner dotted circular line, inner line wall element 28, as shown in FIGS. 1, and 4, depicts the inner wall of the invention's skirt, skirt element S, as shown in FIGS. 2, 3, and 5. The cross hatched area in the center of the invention with the irregular boundary, degraded area element D, as shown in FIGS. 1, 2, 4, and 5, represents that local area of pressure retaining material, element 9, as shown in FIGS. 1, 2, 3, 4, and 5, where material degradation has occurred. The lower right hand corner of FIG. 4 depicts a sample weld joint connection configuration, weld symbol element W, as shown in FIGS. 1, and 4, of the invention to a pressure retaining material, element 9, as shown in FIGS. 1, 2, 3, 4, and 5. Weld symbol element W, as shown in FIGS. 1, and 4, depicts a complete or full penetration weld supplemented by a fillet weld with this fillet weld size being specifically dependent on a pressure loading and geometry of a specific pressure retaining item, a Code or Standard (a Code or Standard is described in the section of this Specification entitled "BACKGROUND OF THE INVENTION"), and the invention size, shape, and geometry.

Drawing Sheet 2/2—FIG. 5

FIG. 5 shows how the invention would look if one were to cut through the center of the invention (refer to View Line 5—5) in either of two directions, the long direction view or the short direction view, after the invention being attached to a pressure retaining material, element 9, as shown in FIGS. 1, 2, 3, 4, and 5. A local degraded area of pressure retaining material, degraded area element D, as shown in FIGS. 1, 2, 4, and 5, can be seen. Also note that FIG. 2 presents the invention as placed on a cylindrical surface. This is only an example of the geometry of surface to which the invention can be applied. An enclosed volume of open annular space, cavity element C, as shown in FIGS. 2, 3, and 5, is formed by placing the invention on the surface of the pressure retaining material, element 9, as shown in FIGS. 1, 2, 3, 4, and 5. The skirt, skirt element S, as shown in FIGS. 2, 3, and 5, of the invention comprises that volume of metal that lies between a) the inner surface of the invention, surface element 31, as shown in FIGS. 2, 3, and 5, that is parallel to the pressure retaining material surface, element 9, as shown in FIGS. 1, 2, 3, 4, and 5, and extends around the periphery of the invention and further extending in approximately a perpendicular direction from the inner surface of the invention, surface element 31, to a point where the end of this volume of metal can be placed such that it is in contact with the surface of the pressure retaining material, element 9. The skirt, skirt element S, as shown in FIGS. 2, 3, and 5, is beveled at the point where it would be placed in contact with the surface of the pressure retaining material at an angle, angle element A, as shown in FIG. 3, suitable for the welding process and procedure selected such that fusion metal welding the skirt, skirt element S, of the invention to the pressure boundary material, element 9, as shown in FIGS. 1, 2, 3, 4, and 5, can achieve complete coalescence of metal at the interface of the invention skirt, skirt Element S, and the pressure retaining material, element 9. The point of contact between the edge, edge element 32, as shown in FIGS. 2 and 3, of the skirt, skirt element S, as shown in FIGS. 2, 3, and 5, at the beveled end where in the skirt, skirt element 9, is contact with the surface of the pressure retaining material, element 9, as shown in FIGS. 1, 2, 3, 4, and 5, may be a knife edge configuration or have some very small flat dimension (refer to dimension element L, as shown in FIG. 3, which depicts this small flat dimension). The small flat dimension, dimension element L, as shown in FIG. 3, of edge element 32, as shown in FIGS. 2, and 3, is of such a length that for the welding process and procedure selected, fusion metal welding the skirt, skirt element S, as shown in FIGS. 2, 3, and 5, of the invention of the pressure boundary material, element 9, as shown in FIGS. 1, 2, 3, 4, and 5, can achieve complete coalescence of metal at the interface of the invention skirt, skirt element S, and the pressure retaining material, element 9.

Figure 6:
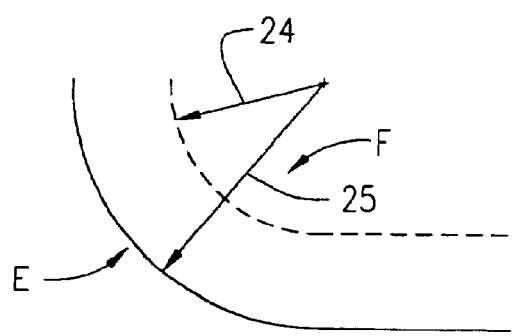

Drawing Sheet 2/2—FIG. 6

This detail shows the basic configuration of how the end outside corner of the invention, outer end corner element E, as shown in FIG. 6, of an obround shaped invention would look at the juncture of an outside long side to an outside rounded end of the invention. This is shown as the solid line in FIG. 6. Additionally, this detail shows the basic configuration of how the inside end, inner end corner element F, as shown in FIG. 6, of an obround shaped invention would look at the juncture of an inside long side to an inside rounded end of the invention. This is shown as the dotted line in FIG. 6.

DETAILED DESCRIPTION OF THE INVENTION

General

The "Local Degraded Area Repair and Restoration Component for Pressure Retaining Items (Pressure Maintenance Cap)", hereinafter referred to as "the invention", is a component used to repair and restore the structural and pressure retaining integrity of pressure retaining items whose pressure retaining material of construction has been subjected to material degradation. The invention consists of a single component of metallic material that is welded to the surface of a pressure retaining item. The invention is welded directly over a section of the pressure retaining item where material degradation has occurred. Installation of the invention on a pressure retaining item can return the structural and pressure retaining integrity, and allowance for corrosion and/or erosion of a pressure retaining item to equal or better conditions than the original as-designed or as-constructed condition of the pressure retaining item.

Construction of Invention

The invention is shown in sample invention Drawing Sheet 1/2, which is a sample drawing of a round shape invention, and Drawing Sheet 2/2, which is a sample drawing of an obround shape invention. The invention can be of any shape including but not limited to round, square, rectangular, obround, oval, triangular, or any combination of the these shapes.

The configuration of the invention is a single piece of metal that has a cavity, cavity element C, as shown in FIGS. 2, 3, and 5, on one side built into it. The cavity, cavity element C, as shown in FIGS. 2, 3, and 5, portion of the invention allows for the invention having a skirt, skirt Element S, as shown in FIGS. 2, 3, and 5, of material completely around its periphery that extends below the inner face surface, surface element 31, as shown in FIGS. 2, 3, and 5, of the invention. The invention can best be described by a comparison to one or more common items. To describe the invention in simple terms would be for one to compare its possible geometric configurations to those of 1) a standard shoe box cover, 2) the lid of a jar, 3) or an open sardine can. These are only illustrative examples for simple comparison to the general geometric configuration of the invention. The invention can be constructed by bending, welding, machining, forming, forging, or casting a piece of metal to match a contour of a surface of a pressure retaining item.

The invention can be manufactured or fabricated from a single piece of metal plate, forging, or casting, or can be fabricated using a combination of metal plate, forging, or casting parts by welding these pieces together to make the invention. Curved areas of the invention may be obtained by rolling the invention in a set of plate rollers to the desired curvature. During this rolling process the cavity of the invention may be filled with a piece of metal plate to prevent damage to the weld end portion of the invention skirt, skirt Element S, as shown in FIGS. 2, 3, and 5. For inventions of very thick parts, the invention may be heated before the rolling process to facilitate the fabrication process. Curved areas of the invention may be made by machining of parts to achieve the desired curvatures. The invention may be manufactured by the casting process wherein all parts including the curved parts of the invention are achieved during the casting process. A forming process wherein the configuration of the invention is arrived at by using a die and forming process may be used to manufacture the invention.

The final process of manufacture may consist of machining and grinding to arrive at the final configuration.

Drawing Elements

The flat plate surface, surface element 31, as shown in FIGS. 2, 3, and 5, of the invention can have a dual function. Where the invention is attached to the surface of a pressure retaining material, element 9, as shown in FIGS. 1, 2, 3, 4, and 5, and where said surface is the opposite side surface to which a pressure or fluid acting to create erosion or corrosion exist, the invention can provide 1) a barrier against pressure integrity loss of the pressure retaining material, element 9, and/or 2) a barrier to prevent or maintain within acceptable limits, erosion or corrosion of the surface. Should the degraded material, degraded area element D, as shown in FIGS. 1, 2, 4, and 5, of a pressure retaining material, element 9, as shown in FIGS. 1, 2, 3, 4, and 5, be breached or leak, the invention maintains pressure integrity of a pressure retaining material, element 9. Additionally the invention maintains structural integrity of a pressure retaining material, element 9, as shown in FIGS. 1, 2, 3, 4, and 5, by its being designed to provide the requisite structural integrity of a pressure retaining material, element 9. The skirt, skirt element S, as shown in FIGS. 2, 3, and 5, which runs around the periphery of the invention maintains pressure Integrity and structural integrity of a pressure retaining material, element 9, as shown in FIGS. 1, 2, 3, 4, and 5, by its being designed to provide the requisite structural integrity of the pressure retaining material, element 9, and transfer of loading from pressure retaining item material, element 9, adjacent to the attached invention into and then through the invention back into a pressure retaining material, element 9. The invention can be designed such that it substantially reduces or eliminates the necessity for the degraded material section, degraded area element D, as shown in FIGS. 1, 2, 4, and 5, to either transfer any load or maintain or provide load bearing capability assistance in the maintenance of structural integrity of a pressure retaining material, element 9, as shown in FIGS. 1, 2, 3, 4, and 5. The cavity, cavity element C, as shown in FIGS. 2, 3, and 5, of the invention allows for the invention to be complete or full penetration weld joined at the skirt, skirt element 3, as shown in FIGS. 2, 3, and 5. end edge, edge element 32. as shown in FIGS. 2 and 3, to a pressure retaining material, element 9, as shown in FIGS. 1, 2, 3, 4, and 5. This type of complete or full penetration weld allows for a complete volumetric examination of a weld to be performed to insure structural integrity of a weld joint of this type weld joint attachment. Additionally, depending on the remaining strength of degraded material, degraded area element D, as shown In FIGS. 1, 2, 4, and 5, encapsulated by the invention the cavity, cavity element C, as shown in FIGS. 2, 3, and 5, of the invention can be pressurized for leak tightness and structural integrity testing. The fabrication of curved surfaces at the skirt, skirt element S, as shown in FIGS. 2, 3, and 5, end edge, edge element 32, as shown in FIGS. 2 and 3, allows for mating of the invention to the surface of a pressure retaining material, element 9, as shown in FIGS. 1, 2, 3, 4, and 5. All machined radius of the invention, radius element 26. as shown in FIG. 3, and radius elements 24 and 25, both as shown In FIG. 6, can be designed to a size required to reduce stress concentrations during operation of a pressure retaining item with the invention installed. The weld between the invention and the pressure retaining material, element 9, as shown in FIGS. 1, 2, 3, 4, and 5, is generally full or complete penetration supplemented by a fillet weld. Fillet welds supplementing full penetration welds attaching the invention to a pressure retaining material, element 9, as shown in FIGS. 1, 2, 3, 4, and 5, can be sized for the requisite load capacity, structural integrity, and pressure integrity. Fillet welds can be sized to comply with requirements that may apply to fillet welds supplementing full penetration welds or to fillet welds in general as required by any Code or Standard being imposed by jurisdictional authorities or governing the overall design and construction of the invention.

Value and Improvement of Invention over Current Repair Methods

The invention offers several improvements and areas of increased value over current methods of repairing eroded/corroded or degraded sections of pressure retaining items. The invention resolves many negative aspects of the "flush patch repair" or "weld build-up repair" current common methods of repair, and offers several advantages. The following includes several of these values and improvements:

1. Removal of pressure retaining item from service
   "flush patch repair"—required
   "weld build-up repair"—required
   Invention—may not be required in all cases
2. Cutting out of pressure retaining item local material degraded areas
   "flush patch repair"—required
   "weld build-up repair"—not required
   Invention—not required
3. Preparation of pressure retaining item material for welding during repair method
   "flush patch repair"—required
   "weld build-up repair"—required
   Invention—may not be required or minimal if required
4. Installation of weld joint backing strips (backing strips can cause a reduction in the pressure retaining item factor of safety or even worse the acceleration of new local areas of corrosion or erosion)
   "flush patch repair"—may be required
   "weld build-up repair"—not required
   Invention—not required
5. Potential exposure of personnel to lethal or hazardous fluid contents such as chemical, gas, or radioactive fluid contents of the pressure retaining item
   "flush patch repair"—yes
   "weld build-up repair"—yes
   Invention—no
6. Potential for damage to internal parts of pressure retaining items such as damage to tubes of heat exchangers. Damage to tubes of heat exchangers may necessitate repair or plugging of the tubes with an associated loss in equipment performance and economic loss or tube replacement with associated economic cost.
   "flush patch repair"—yes
   "weld build-up repair"—yes
   Invention—no
7. Potential for intrusion of foreign materials into the internals of pressure retaining items.
   "flush patch repair"—yes
   "weld build-up repair"—yes
   Invention—generally no
8. Hydrostatic or pneumatic testing of pressure retaining item after repair to insure pressure retaining integrity has been maintained due to breach of pressure boundary
   "flush patch repair"—generally required
   "weld build-up repair"—generally required
   Invention—not generally required
9. Improved structural and pressure retaining integrity of pressure retaining item at location of material degradation
   "flush patch repair"—possible
   "weld build-up repair"—generally not possible
   Invention—generally yes
10. Improved corrosion/erosion allowance of pressure retaining item at location of material degradation
    "flush patch repair"—possible
    "weld build-up repair"—generally not possible
    Invention—generally yes
11. Repair Hardware Cost
    "flush patch repair"—generally lower than invention
    "weld build-up repair"—lowest
    Invention—generally highest
12. Installation Cost
    "flush patch repair"—generally higher than invention
    "weld build-up repair"—generally higher that invention
    Invention—generally lowest
13. Economic Cost Due to Facility/Process Downtime
    "flush patch repair"—generally much higher than invention
    "weld build-up repair"—generally much higher than invention
    Invention—generally very low
14. Personnel Environmental (Lethal Fluid/Radiation) Exposure Risk
    "flush patch repair"—generally much higher than invention
    "weld build-up repair"—generally much higher than invention
    Invention—generally eliminated
15. Degraded Material Disposal Cost Due
    "flush patch repair"—higher than invention
    "weld build-up repair"—very low, possibly none
    Invention—none An additional positive aspect of the invention is that if the section of degraded material of a pressure retaining item, where said material is encapsulated by the invention, continues to further degrade after attachment of the invention, such that the pressure retention integrity of the pressure retaining item at said material location is breached, then:

the invention can provide for complete retention of the pressure retaining item's pressure integrity and with the original or better factor of safety against leakage or failure and with equal or better corrosion/erosion allowance or capability based on the inventions thickness and/or material of construction.

In most cases, but not all, the attachment weld joining the invention to a pressure retaining item would be a complete or full penetration weld whose final as-welded configuration allows for a complete through wall volumetric examination of the weld to be performed (generally by ultrasonic examination). Additionally, where desired, the cavity between a pressure retaining item surface and the invention can be internally pressurized within the remaining structural and pressure integrity capability of an encapsulated section of material of a pressure retaining item for further leak tightness assurance.

What I claim as my invention is:

1. A metal component for encapsulating a degraded but not yet breached section of a pressure retaining item constructed of a pressure retaining material comprising a pressure maintenance cap having an inner face surface and an outer face surface and having a raised skirt near or on the periphery of said inner face surface that extends substantially perpendicular from the inner face surface, wherein the skirt has an edge in direct contact with the pressure retaining material and the skirt surrounds the degraded section of pressure retaining material, wherein the pressure maintenance cap is adapted to be integrally attached only by complete penetration fusion welding to form a complete coalescence of metal of the skirt of the pressure maintenance cap and the pressure retaining material such that a cavity between the pressure retaining material and the pressure maintenance cap can be formed.

2. A metal component in accordance with claim 1 wherein said raised skirt is shaped in cross section in the form of a bevel.

3. A metal component in accordance of claim 1 which is casted.

4. A metal component in accordance with claim 1 which is forged.

5. A metal component in accordance with claim 1 which is machined.

6. A metal component in accordance with claim 1 wherein said skirt is welded to said inner face surface.

7. A metal component in accordance with claim 1 wherein said inner face surface is formed to be substantially parallel to the section of the pressure retaining surface to be encapsulated.

8. A method for repairing a degraded section of a pressure retaining material comprising the steps of:

a) obtaining a pressure maintenance cap having an inner face surface and an outer face surface and a raised skirt near or on the periphery of said inner face surface that extends substantially perpendicular from the inner face surface;

b) placing said pressure maintenance cap with said skirt in direct contact with the pressure retaining material wherein the skirt surrounds the degraded but not yet breached section of the pressure retaining material; and c) complete penetration fusion metal welding the skirt of the pressure maintenance cap to the pressure retaining material wherein complete coalescence of metal of the skirt and pressure retaining material is achieved, and wherein a cavity between the pressure retaining material and the pressure maintenance cap is formed.

9. A method in accordance with claim 8 including the step of pressurizing the cavity between the pressure retaining material and the pressure maintenance cap.

10. A method in accordance with claim 8 including the step of providing a fillet weld about the periphery of said pressure maintenance cap.

11. A method in accordance with claim 8 including the step of forming said inner face surface such that it is substantially parallel to the degraded section of the pressure retaining material.

12. A method in accordance with claim 8 wherein said fusion metal welding step includes the step of complete penetration fusion metal welding a skirt beveled in cross section.

13. A method in accordance with claim 8 where the step of obtaining a pressure maintenance cap includes the step of filling the area of the pressure maintenance cap within the skirt with a metal plate, and forming the combined metal plate and pressure maintenance cap to form the pressure maintenance cap to the shape of the pressure retaining material without damaging the skirt.

14. A reinforced pressure retaining item having a degraded section comprised of degraded pressure retaining material, comprising:

a pressure maintenance cap having an inner surface and an outer surface and having a raised skirt near or on the periphery of said inner surface that extends substantially perpendicular from the inner surface;

said pressure maintenance cap being positioned on said pressure retaining material such that the skirt surrounds the degraded section of pressure retaining material;

said skirt having an edge in direct contact with and complete penetration fusion welded to the pressure retaining material of the pressure retaining item; and said skirt of the pressure maintenance cap being integrally attached to the pressure maintenance material by complete penetration fusion welding which forms a complete coalescence of metal of the skirt of the pressure maintenance cap and the pressure retaining material while maintaining a cavity between the pressure retaining material and the inner face surface of the pressure maintenance cap.

15. An apparatus in accordance with claim 14 wherein said pressure maintenance cap is machined.

16. An apparatus in accordance with claim 14 wherein said pressure maintenance cap is casted.

17. An apparatus in accordance with claim 14 wherein said pressure maintenance cap is formed by welding said skirt to said inner face surface.

18. An apparatus in accordance with claim 14 wherein said skirt is beveled in cross section.

19. An apparatus in accordance with claim 14 including a fillet weld around the periphery of said pressure maintenance cap.

20. An apparatus in accordance with claim 14 wherein said inner surface of said pressure maintenance cap is formed to be substantially parallel to said degraded section of pressure retaining material.

* * * * *

UNITED STATES PATENT AND TRADEMARK OFFICE
CERTIFICATE OF CORRECTION

PATENT NO.     : 6,860,297 B2
DATED          : March 1, 2005
INVENTOR(S)    : Manzon It is certified that error appears in the above-identified patent and that said Letters Patent is hereby corrected as shown below:

Column 1,
Line 44, insert -- , -- between "petrochemical" and "process".
Line 48, delete "way" and substitute therefor -- may --.

Column 2,
Line 45, delete "of" after "operation," and substitute therefor -- or --.

Column 4,
Lines 30, 34, 38, 40, 41, 45, 50, 55 and 56, delete "cap" and substitute therefor -- invention --.
Line 36, delete "cap" after "which the" and substitute therefor -- invention --.
Line 36, delete "cap" after "The" and substitute therefor -- invention --.

Column 7,
Line 1, delete "As" and substitute therefor -- An --.
Line 19, delete "shwon" and substitute therefor -- shown --.
Line 21, delete "pressur" and substitute therefor -- pressure --.
Line 48, delete space after "material" and before ",".

Column 8,
Line 2, add -- to -- after "were".

Column 10,
Line 55, delete "Integrity" and substitute therefor -- integrity --.

UNITED STATES PATENT AND TRADEMARK OFFICE
CERTIFICATE OF CORRECTION

PATENT NO. : 6,860,297 B2
DATED : March 1, 2005
INVENTOR(S) : Manzon

It is certified that error appears in the above-identified patent and that said Letters Patent is hereby corrected as shown below:

<u>Column 11,</u>
Line 5, delete "clement 3" and substitute therefor -- element S --.
Line 6, delete "." after "5" and substitute therefor -- , --.
Line 6, delete "." after "32" and substitute therefor -- , --.
Line 23, delete "." after "26" and substitute therefor -- , --.
Line 24, delete "In" and substitute therefor -- in --.

Signed and Sealed this

Sixteenth Day of August, 2005

JON W. DUDAS
*Director of the United States Patent and Trademark Office*